Figure 1A:
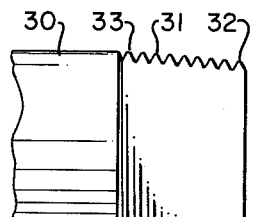

United States Patent [19]

Fredd

[11] 4,117,563
[45] Oct. 3, 1978

[54] THREAD CHASER TOOL FOR CONTIGUOUS STRAIGHT AND TAPERED THREAD RUNS

[75] Inventor: John V. Fredd, Dallas, Tex.

[73] Assignee: Otis Engineering Corporation, Dallas, Tex.

[21] Appl. No.: 745,799

[22] Filed: Nov. 29, 1976

Related U.S. Application Data

[63] Continuation-in-part of Ser. No. 555,639, Mar. 5, 1975, Pat. No. 3,940,764.

[51] Int. Cl.² .................. B23G 1/00; B26D 1/12
[52] U.S. Cl. .................. 10/101 R; 407/66; 407/120
[58] Field of Search .................. 29/95 R; 10/101, 120, 10/120.5; 408/121

[56] References Cited

U.S. PATENT DOCUMENTS

| Re. 3,940 | 4/1870 | Pierce | 29/95 R |
|---|---|---|---|
| 21,641 | 9/1858 | Kendall et al. | 10/101 |
| 490,638 | 1/1893 | Clough | 29/95 R |
| 1,428,075 | 9/1922 | Breckenridge | 10/101 |
| 1,737,739 | 12/1929 | Stenman | 10/101 |
| 1,740,604 | 12/1929 | Kienzl | 10/101 |
| 2,534,230 | 12/1950 | Chandler | 29/95 R |

FOREIGN PATENT DOCUMENTS

| 1,059,743 | 6/1959 | Fed. Rep. of Germany | 10/101 |
|---|---|---|---|
| 940,793 | 3/1956 | Fed. Rep. of Germany | 10/101 |
| 226,546 | 5/1925 | United Kingdom | 29/95 |
| 379,930 | 9/1932 | United Kingdom | 10/101 |

Primary Examiner—Harrison L. Hinson
Attorney, Agent, or Firm—Warren H. Kintzinger

[57] ABSTRACT

A thread chaser tool with cutting edge defined by two symetrical points. The tip radii of the two points are spaced apart slightly less than the pitch of a thread to be cut. The thread form is generated by the inside flanks of each point and a crestforming radius there between. Both points cooperate in forming the long flanks of either male or female tapered threads, and both points form straight threads having two roots.

5 Claims, 12 Drawing Figures

U.S. Patent  Oct. 3, 1978  Sheet 1 of 2  4,117,563

(PRIOR ART TOOL)

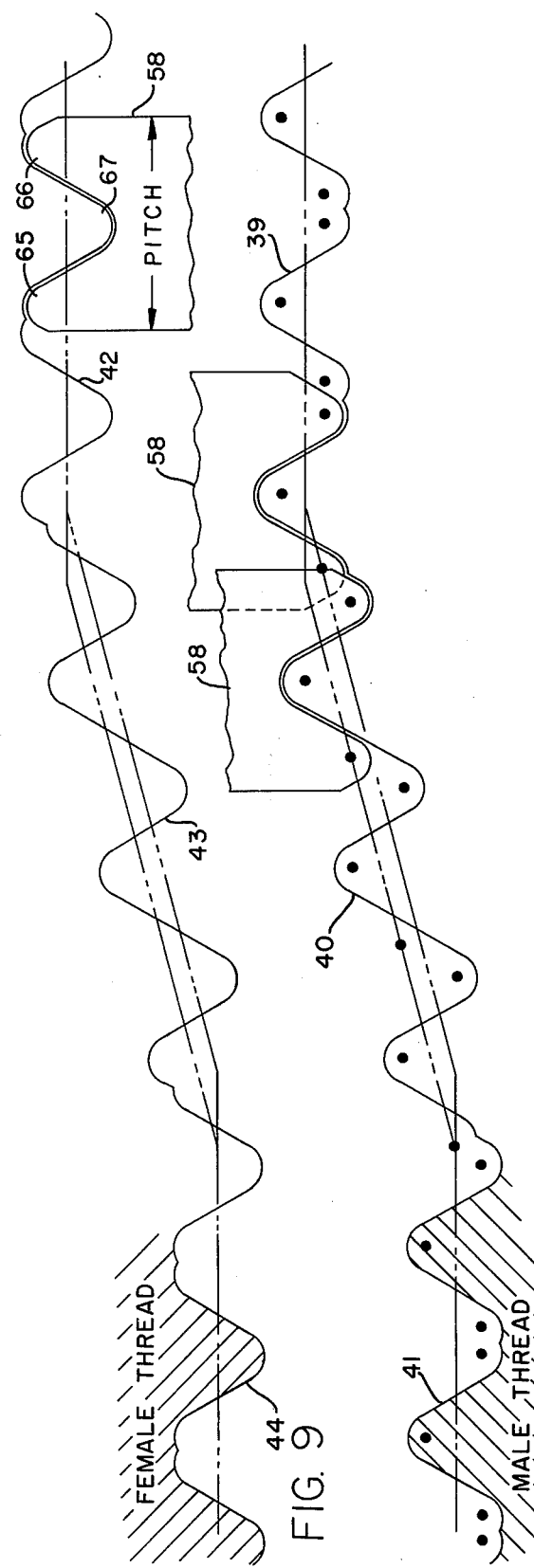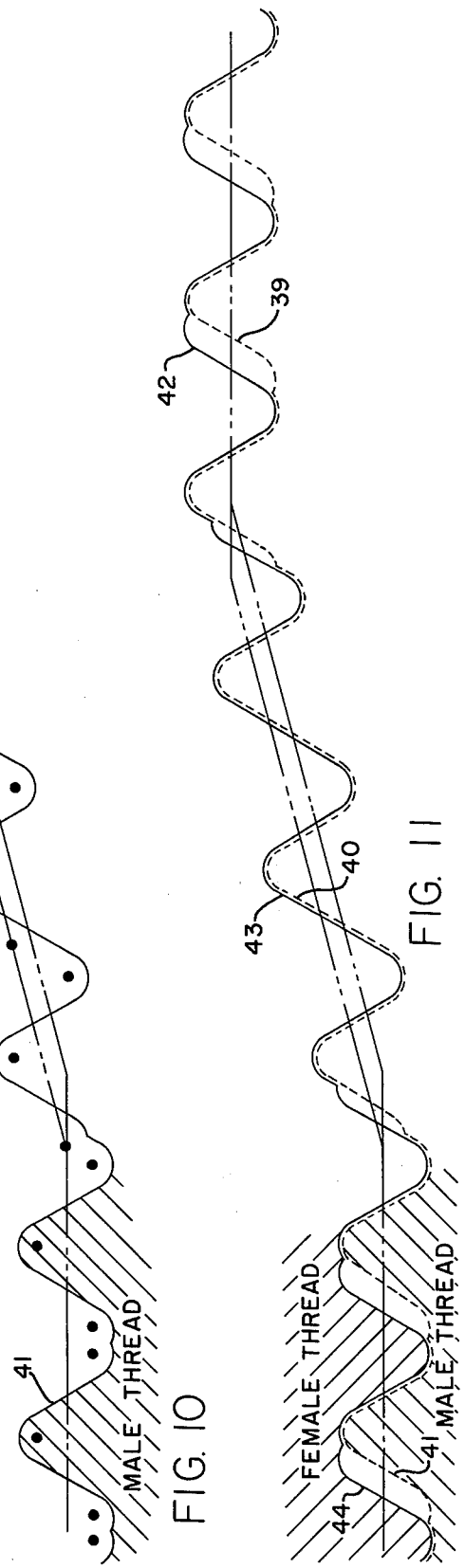

THREAD CHASER TOOL FOR CONTIGUOUS STRAIGHT AND TAPERED THREAD RUNS

This application is a continuation-in-part of my copending application Ser. No. 555,639, filed Mar. 5, 1975 U.S. Pat. No. 3,940,764.

This invention relates in general to threaded interconnections and, in particular, to a new and novel thread chaser tool useful in cutting contiguous straight and tapered threads with a continuity of pitch throughout the thread run.

In my copending application assigned to the assignee of the present invention, there is described a new and improved telescopical pipe coupling for joining threaded members, that provides, in accordance with its stated objective, a pipe extension joint assembly that is adjustable in length without affecting the fluid-tight integrity of the threaded connections. The pipe coupling includes a leakproof, straight-threaded connection permitting longitudinal adjustment of the coupling with maintenance of pressure seal, and that does not require gaskets for sealing against leakage. These objectives are attained by a coupling that has first and second, mutually telescoping pipe members interconnected by a gland that is threaded both internally and externally. One of the gland threads, and a pipe member thread with which it engages, are formed with matching tapered threads, such that a wedging action between the gland and pipes is realized when the gland is tightened. This wedging action squeezes the gland, radially, to aid in effecting a seal along the mating straight threads of the gland and mating straight threads of one of the pipes. Prior to final tightening to effect the seal, one of the pipes is rotatable, with respect to the gland, along the respective mating straight-threaded interconnection, thus permitting adjustment of the make-up length of the coupling between the sections and/or changes in the relative positions of alignment of the connected pipe sections with pressure seal integrity maintained. The coupling thus utilizes the wedging action of a matching, tapered gland and pipe thread connection to force straight threads on an opposing gland wall to pressure-seal against engaged ones of matching straight threads, and the telescoping coupling maintains inside and outside pressure seal as concerns the interconnecting gland, while permitting that pipe member, in straight-threaded engagement with the gland, to rotate, with respect to the gland, and yet maintain pressure seal.

The use of threaded interconnections as between pipes has long employed standard tapered threaded interconnect to provide a pressure sealing feature. Standard tapered threaded interconnections might employ, for example, fifteen or more tapered threads of standard three-fourths-inch-per-foot taper, and these threaded interconnections are known to seal by metal-to-metal compressive stress in the made-up interconnection. The sealing competence is directly related to this compressive stress, and while increased tapers would increase the stress, the overall stress might become destructive under conditions wherein a standard make-up torque is applied in joint make-up employing a considerable number of tapered threads in the interconnection.

In applications of standard tapered threads in the pipe coupling structure defined in the above-reference application, an exacting control of make-up torque is paramount to the utilitarian features provided by the joint. Further, predictable make-up lengths in such a coupling is of considerable importance when such couplings are made up in down-hole locations in wells. In order to improve make-up length predictability in a telescopical pressure-sealed pipe coupling, as well as in a threaded interconnection, per se, my application Ser. No. 555,630 teaches a threaded interconnect structure incorporating respective matching, internal and external threaded portions of members to be threadedly interconnected, with these portions having a thread design defined as straight - tapered - straight (STS), wherein the threading comprises a first plurality of threads having standard straight-thread diameter, and a second axially displaced plurality of threads having a different standard straight thread diameter, with the first and second straight threaded portions being separated by a middle plurality of threads having a linear taper so as to form a continguous thread-run from one straight-thread diameter to the other, with the same pitch being maintained throughout.

While a single point thread chaser can be shaped to produce either straight or tapered threads of ideal form, if used for both straight and tapered continuous threads (and male and female parts as well) a fatal mismatch will occur. If tapered threads fit properly, the straight threads will have excessive clearance, or will load up on the wrong flanks. High pressure or mechanical tension will require excessive distortion of the tapered threads before the straight threads load up. If tapered and straight threads are mechanically compatible, the tapered threads will leak due to the crest and side clearance.

It is therefore a principal object of this invention to provide a new and novel thread chaser tool, useful in cutting thread profiles including straight-tapered thread transitions with the same pitch maintained throughout.

A further object is the provision a thread chaser tool useful in cutting both male and female matching thread profiles.

A still further object is the provision of a thread chaser tool useful in machining a thread on a part that is rotating and advancing at a constant pitch (feed) in a manner that will produce contiguous straight and tapered threads having new and improved ability to seal and withstand mechanical loads at the same time.

Features of the invention useful in accomplishing the above objects include a thread chaser tool the cutting edge of which is defined as having two symmetrical points such that a thread form is generated thereby by the inside flanks of each point and a crest-forming radius there-between, the tip radii of the two points being spaced apart slightly less than the pitch of a thread to be cut thereby. Both points cooperate in forming the long flanks of either male or female tapered threads and both points form straight threads having two roots. By providing "crest control" upon make-up the root shift that occurs is of no consequence.

A specific embodiment representing what is presently regarded as the best mode of carrying out the invention is illustrated in the accompanying drawings.

Figure 1B:
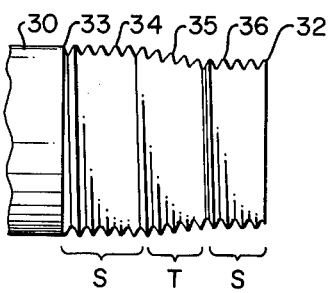
Figure 5:
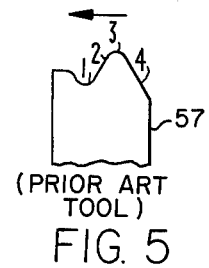
Figure 2:
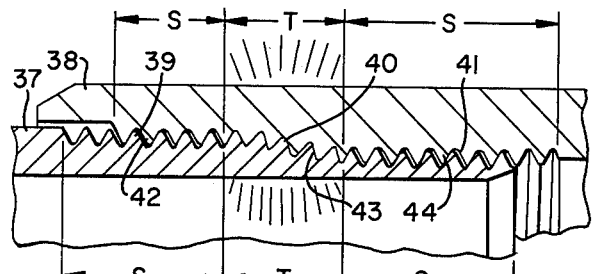
Figure 6:
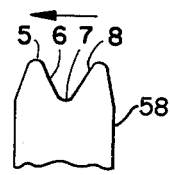
Figure 3:
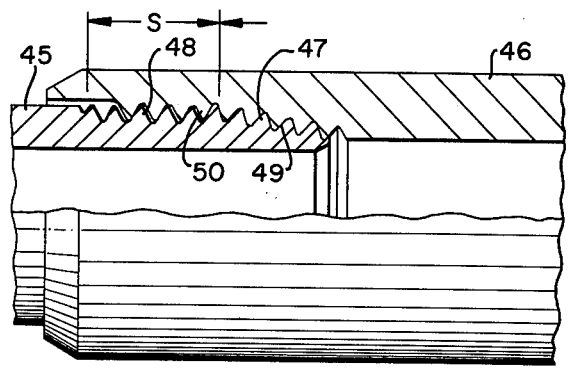
Figure 7:
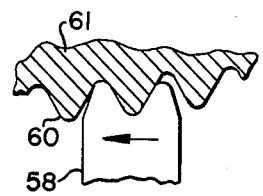
Figure 4:
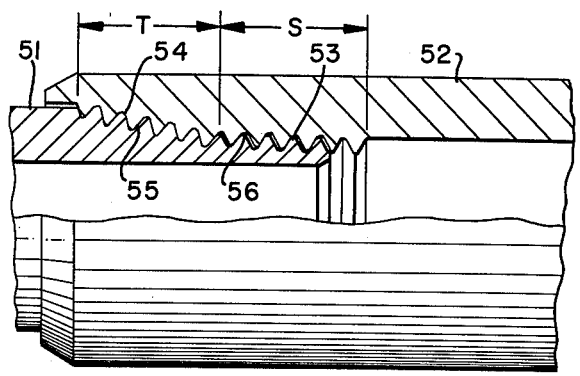
Figure 8:
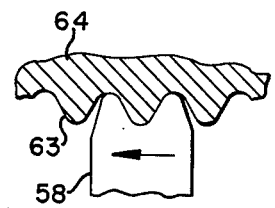

In the drawings:

FIG. 1A represents a diagramatic representation of standard tapered pipe thread;

FIG. 1B, a diagramatic representation of an improved pipe thread having contiguous standard-tapered-standard sections;

FIG. 2, a diagramatic representation of the sealing and drive competence features of the improved standard - tapered - standard thread of the invention, as employed in a pipe joint interconnect;

FIG. 3, a diagramatic representation of a further threaded interconnect employing a straight-tapered internal thread and matching external thread;

FIG. 4, a diagramatic representation of a still further pressure sealing threaded interconnection employing a tapered-straight thread profile sequence for the internal thread and matching external thread;

FIG. 5, an illustration of the cutting profile of a standard taper-thread chaser tool;

FIG. 6, an illustration of the cutting profile of a new thread chaser tool useful in cutting both the straight and tapered thread profiles defining the straight-tapered-straight thread described herein;

FIG. 7, a diagramatic illustration of the chaser of FIG. 6, as employed in cutting a tapered thread profile;

FIG. 8, a diagramatic illustration of the chaser of FIG. 6, as employed in cutting a straight thread profile;

FIG. 9, a detailed female thread profile geometry as cut by the chaser tool of FIG. 8;

FIG. 10, a detailed male thread profile geometry, matching the female thread of FIG. 9, as cut by the chaser tool of FIG. 8; and FIG. 11, a detailed make-up geometry of the female and male threads of FIG. 9 and FIG. 10.

Referring to the drawings:

FIG. 1A and FIG. 1B diagramatically depict the basics of the known standard tapered thread and my new straight-tapered-straight thread geometry. A tubular member 30 is shown with external standard tapered threads 31, having an expanding standard taper of ¾" per foot, running from minimum diameter end thread 32, and increasing to maximum diameter thread 33. The number of threads in a standard tapered thread run for pipe joints might be fifteen or more. If the standard tapered thread 31 of FIG. 1A is axially divided into three sections, the taper of the middle section increased from standard, and the taper of the end sections eliminated, the thread profile can be described as being straight-tapered-straight (STS). FIG. 1B illustrates an STS external thread formed on a tubular member 30 wherein the first section of threads 36 are straight threads having the diameter of end thread 32, the middle section of threads 35 is formed with a taper greater than that of standard taper, and the last section of threads 34 are straight threads having the diameter of the terminal thread 33.

Now, by limiting the number of tapered threads 35 to from three-to-five rather than the normal fifteen or more that comprise a standard taper thread run, the metal-to-metal compressive stress is increased, thereby increasing joint sealing competence. The increased taper (as compared to standard taper) of the tapered threads 35 prevents the compressive stress from becoming destructive when standard make-up torque is applied in making up a joint. The amount of rotation between hand-tight and full-torque, as they relate to joint make-up, is also reduced and the make-up length of a joint employing STS thread profiles is therefore more predictable than it is in joints employing standard tapered threads. The straight threads in the STS threaded joint provide mechanical back-up for the sealing tapered-thread section of the joint. If axial loading or high pressure causes the tapered threads to yield slightly, the straight threads will pick up part of the load. Also, particularly in the case of thin-walled connections, the straight thread projections will radially and axially reinforce the tapered sections and swaging of the male threads and swelling of female threads will be resisted by respective straight-thread projections, thus greatly increasing both pressure and mechanical competence of the joint in both directions.

The above features are diagramatically illustrated in the threaded joint of FIG. 2, where tubular members 37 and 38 are threadedly interconnected to form an improved pressure-sealed joint, using matching STS thread profiles for the external threads of tubular member 37 and the internal threads of tubular member 38. Matching tapered threads 40 and 43, of taper in excess of standard taper, form a tight sealing region in the manner of standard tapered interconnections because of compressive stress imparted by the make-up. The straight thread sections of the threaded interconnection, as formed from engaging ones of threads 39 and 42, and engaging ones of threads 41 and 44, add mechanical rigidity to the sealed interconnection, and permit the increased taper of the tapered interconnection between threads 40 and 43, by mechanically aiding in the joint make-up. Upon joint make-up, straight threads 41 and 44 tend to pull the following tapered interconnection, while straight threads 39 and 42 tend to push the preceeding tapered interconnect. Thus, both mechanical integrity and sealing integrity are improved, over a standard tapered-thread interconnection, with the straight thread portions mechanically aiding in overcoming the increased resistance of the increased taper of the center section, while, the fewer tapered threads employed, as compared to standard tapered interconnections, realizes increased metal-to-metal compressive stress, with attendant increase in pressure sealing integrity. Further, since fewer tapered threads need to be employed to realize a given pressure-seal-defining compressive stress, the overall compressive force of the tapered-thread section is lessened, and the make-up of a pressure-sealed interconnection is less liable to generate destructive compression forces.

For particular usages, the new thread profile described herein may logically be contemplated to extend to the use of threaded interconnections employing straight-tapered and tapered-straight thread profiles.

Referring to FIG. 3, a threaded joint between tubular members 45 and 46 is diagramatically illustrated. Here, the initial run of external threads 47 on tube 45 comprises a tapered-thread run of comparatively fewer threads than would a standard tapered thread, followed by a run of straight threads 48. The tubular member 46 is formed with a matching internal thread geometry defined by a run of tapered threads 49 and continuous straight threads 50. The combination of straight and tapered threads employed in the joint of FIG. 3 enjoys the advantage of the previously described STS threaded interconnections in that fewer tapered threads of increased taper, in combination with the mechanical assistance of the straight thread run, permit a sealing joint with improved make-up length and make-up torque predictability, and increased seal integrity without the danger of destructive compressive force developing during make-up of the joint. In the joint of FIG. 3, the resistance encountered by the initial compression tapered thread sections during make-up is mechanically aided by the pushing action of the following straight thread section.

Referring now to FIG. 4, a threaded interconnection between tubular members 51 and 52 is diagramatically illustrated. Here, the initial run of external threads 53 on tubular member 51 is a straight thread section, and this straight thread section is contiguous with a following run of tapered threads 54. As in FIG. 3, the number of tapered threads 54 is less than that employed in standard-tapered threaded joints, and the taper is in excess of that of the standard taper of ¾" per foot. The improvement in the joint of FIG. 4 is comparable with that of FIG. 3, in that a greater metal-to-metal compressive stress is realized by the increased taper of the tapered section, while the overall compressive stress need not be destructive, since fewer tapered threads are employed. The threaded engagement of the straight threads 53 and 56 mechanically aids, during application of make-up torque to the joint, by exerting a pulling action on the tapered section. Should axial loading or pressure cause the tapered threads to yield slightly, both radial and axial reinforcement for the tapered section is provided by the straight sections, with attendant advantage of resistance to swaging of male threads and swelling of female threads in the tapered section under these load conditions.

The STS, TS, and ST thread geometries described herein are formed with maintenance of uniform pitch throughout the profile, and may be cut, both internally and externally, by the thread chaser of the present invention, by means of which continuity of pitch and proper mating may be attained throughout a profile having contiguous straight and tapered sections. This thread chaser, herein defined as an STS chaser, might best be described and understood by first considering standard threading principles and standard chasers as currently employed in cutting straight and standard-taper thread profiles.

When cutting threads, with the exception of small threads cut with taps and dies, it is almost universal practice to utilize a lead screw to advance a tool holder at a definite pitch. Chasers may cut threads in a single pass, or a single tool may make multiple passes to finish a thread. In any event, whether in an engine lathe or in an automatic threading machine, the final pass produces the full thread form. The threading tool might be fed into the work piece straight, or fed parallel to one of the flanks. In cutting threads, it can therefore be concluded that the pitch of the thread is the same as the pitch of the lead screw.

A single-point threading tool, as used for cutting standard tapered threads, is depicted in FIG. 5 which illustrates the cutting edge of a cut-away portion 57 of such a tool. This is a single-point tool, with an additional crest-radius-forming projection on the leading (long flank) side. In cutting a tapered, external thread, this chaser first forms the crest radius (1), and then subsequently, the long flank (2), root radius (3), and short flank (4).

When cutting a thread profile such as the STS thread described herein, a single-point threading tool, traversing a straight section and switching to a tapered section will, if fed perpendicularly to the work axis, hold the same lead. The locus of the chaser point will shift from a helix to a helical spiral; that is, the chaser point will remain in the same helical (corkscrew) plane at all times, generating a helix when feeding straight, and generating a helical spiral when also moving either toward or away from the work axis. Thus, a single point chaser would cut an STS thread with its root always in the same helical plane.

Point-to-point pitch measurements are longer for a tapered thread than for a straight thread. In other words, element-to-element (root-to-root, for example) distance for a straight thread is equal to the lead; but, for a tapered thread, this distance is equal to the lead times the secant of the taper angle from the work center-line. Thus a transition from straight to tapered threads results in a shift of some elements of the thread profile. For instance, the sides of a tapered thread will evolve into a long flank and a short flank, and the crests will shift, accordingly, with respect to the roots. Male threads will have longer flanks on the side of the thread root in the direction of increasing diameter. Female threads will have longer flanks in the direction of decreasing diameter.

A single point chaser will cut an STS thread with crests in one helical plane in the straight sections, and with crests in another helical plane in the tapered section. Since the crest shift that occurs on a male thread is away from the small end, and because the male thread crest engage the female thread roots, the shift that occurs is in the wrong direction, and when the tapered threads "make-up", the straight threads become looser, with the required pitch diameter clearance adding further clearance to the already loose straight threads.

Conversely, to eliminate, or actually reverse the undesirable crest shift caused by the single-point chasers when employed to cut transitions between straight and tapered thread sections of an STS thread profile, "control" may be transferred from the thread root to the thread crest by a thread chaser having two points. FIG. 6 illustrates a two-point chaser in accordance with the present invention depicting the cutting edge of a cut-away portion 58 of the chaser. This new STS thread chaser is a double point tool with short flank edges connecting the centrally located crest-forming radius with the symmetrical root-forming points. When employed to cut a tapered thread, the chaser of FIG. 6 first cuts the root radius (5), then the short flank (6), the crest radius (7), and subsequently, the long flank (8). Because the points of the STS chaser of FIG. 6 are symmetrical, both points are always at exactly the same radius, and because the points are at the same radius when cutting tapered threads (as depicted in FIG. 7 by threads 60 on work piece 61), they travel in slightly different conical planes and the leading edge will cut a deeper groove than the path followed by the trailing point. To compensate for this radial difference, the points are moved toward each other, such that (FIG. 7) the nose radius of the leading point is placed in line with the flank that is cut by the trailing point.

When cutting straight threads, as depicted in FIG. 8 by straight threads 63 on work piece 64, STS chasers form the crest radius and both flanks of a thread simultaneously. The spacing across the root-forming points being slightly closer than the thread pitch results in the root width being oversize. However, because STS chasers are two-point, or crest-forming tools, it is possible, by controlling pitch diameter, to make the transition from straight to tapered, to straight, and to regulate the spacing of male and female straight threads. By properly spacing pitch diameters, it is possible (in a make-up of an STS threaded interconnection) to load the straight threads at the same time the tapered threads become fully engaged. By more closely spacing pitch diameters, it is further possible to preload the straight threads, in which case the tapered threads would load up more heavily on the leading flanks, and the straight threads on opposite flanks.

The ideal spacing of straight-threaded pitch diameters is exactly the same as the difference in pitch diameter that occurs in one-half pitch distance of the tapered thread. Stated another way, the difference in pitch diameter from a crest to the nearest root of the tapered thread is the ideal pitch diameter for the straight thread.

FIG. 9 shows a detailed thread profile geometry of a female thread as cut by the chaser tool 58. Tool 58 is shown in position with the tool points 65 and 66 being separated by a distance slightly less than the thread pitch and with the inside flanks forming a single thread crest 67. Since the tool points are spaced less than the thread pitch, the chaser 58 forms double roots in the straight thread sections. Pitch continuity is depicted throughout the STS profile illustrated in FIG. 9 which includes a run of straight threads 42 followed by contiguous runs of tapered threads 43 and straight threads 44.

FIG. 10 shows a detailed thread profile geometry of a male thread, cut by chaser 58, and matching the female thread of FIG. 9. Here chaser 58 is depicted in positions as it begins to form the transition from a straight to a contiguous tapered section of the thread profile, with the nose radius of the leading chaser point placed in line with the thread flank that is cut by the chaser trailing point as the chaser advances along the thread run. Notice that the chaser points, in being slighly closer spaced than the thread pitch, compensate for the tapered thread, where on the high side of the taper, the root forming point will be further away from center line on male thread than the leading side, and the spacing is a function of the flank angle of the threads and difference in pitch diameter. Chaser point spacing is thus a function of the actual taper of the tapered threads, and each chaser will be suitable for one pitch.

FIG. 11, shows the matching male and female threads of FIGS. 9 and 10 in make-up engagement, showing in detail the make-up loading depicted generally in the threaded interconnection of FIG. 6. Maintenance of pitch continuity throughout the tapered and straight profile sections and transitions therebetween and proper loading upon make-up is made possible by the thread chaser tool of the present invention.

The chaser tool described herein is characterized as having two symmetrical points such that the thread form is generated by the inside flanks of each point and a crest-forming radius therebetween, with the point tip radii being spaced apart slightly less than the thread pitch in such a manner that both chaser points cooperate in forming the long flanks of either male or female tapered threads and both points form the roots of either male or female straight threads. Both tapered and straight threads can have loading flanks all in the same helical plane. The foreshortened chaser tool point spread (slightly less than the thread pitch) compensates for the aforedescribed prior art shift that occurs when employing a single point chaser in translating from straight to tapered threads. When a single point chaser is used, the thread root is the element having "control", and, when changing from straight to tapered thread, a crest shift occurs that is toward the smaller diameter on a male connector and toward the larger diameter on the female connector; thus opposite to the desired direction and resulting in a joint having straight thread flank clearance on the wrong side to accept axial loading.

The dual point thread chaser of the present invention provides "crest control". Since all crests and flanks are in common helical locii, the root shift that occurs is of no consequence. Straight threads will have two roots as shown in FIGS. 9 – 11, and the straight thread clearance will be on the proper side.

To summarize, using the crest control of the STS chaser to cut STS thread profiles, all elements of the thread crest, including the thread flanks, have identical helical plane locii. The two-point STS chaser will cut male STS threads having a root shift in the tapered section toward the smaller diameter, and will cut female STS threads having a root shift in the tapered section toward the larger diameter. As the crests of one thread engage the roots of a mating thread, the root shift of mating parts is accommodated rather than compounded. The root shift of an STS threaded joint will be of the same exact magnitude as the incremental lead variation of the joint proper. In order to have all of the loading flanks of straight and tapered sections of an STS point in contact at the same time, a straight thread pitch diameter clearance is specified. The magnitude of this clearance is a function of the thread-to-thread diametral variation in the tapered section.

The pitch diameter clearance for straight thread sections of STS threads is the same as the change in diameter in the tapered section that occurs over one-half of the pitch distance. If the pitch diameter clearance for STS threads is smaller than this specification, the tapered threads will be misaligned when the joint begins tightening. That is, the straight thread flanks that load up in tension will be in contact before the same flanks in the tapered section contact each other, and the straight section will be pulling the joint together while the tapered section attempts to push the joint apart. If the pitch diameter clearance for STS threads is greater than the above specification, however, the tapered sections will carry all of the sealing and mechanical loads, and the straight threads will act as mechanical backup for the tapered section.

STS threaded joints can be made having clearances or interferences between the straight and tapered sections in several useful combinations: STS threaded joints can be made with linear or diametral discontinuities between straight and tapered sections; STS threaded joints can be made with tapered sections having a slightly different lead from the straight sections, by feeding the chaser at a slight work angle to the work axis; STS threaded joints can be made to "load up" axially and radially in almost any sequence or combination desired; STS threaded joints can be made to seal better and carry higher mechanical loads than conventional tapered threads, and provide these advantages when made up with much less torque; and STS threaded joints can be made with sealing and mechanical functions completely isolated from each other, and can be made with sealing and loading competence varying greatly with respect to each other.

It should be noted that the new thread chaser herein described makes possible a new and unique combination of male and female straight and tapered contiguous runs of threads as finish cut with the new thread chaser. The thread chaser described herein is a tool that can, while moving at a constant lead (or pitch) cut threads with loading flanks (flanks that resist pressure or tension loads) all in the same helical plane regardless of excursions along straight and tapered thread runs in any combination. As long as proper tapers and straight-thread clearances are maintained and pitch "envelopes" of mating parts are identical, joints having numerous straight and tapered sections can be manufactured that can provide seal redundancy, sealant reservoires, and test regions along with other useful applications.

Whereas, this invention is herein illustrated and described with respect to a particular embodiment thereof, it should be realized that various changes may be made without departing from essential contributions to the art made by the teachings hereof.

I claim:

1. A thread chaser tool useful in cutting mating male and female contiguous straight tapered thread profiles having the same predetermined pitch, with pitch continuity maintained throughout the profile, said tool comprising: a cutting edge crest forming profile midway between a pair of symmetrically disposed, like-shaped root-forming point profiles with flank cutting edges contiguous with said crest forming profile; with the distance between said root-forming point profiles equal to the normal pitch distance of the male and female threads cut by said thread chaser tool minus a small space increment relative to the predetermined normal pitch distance; with the predetermined normal pitch distance being a definitive measurement function of the rate of cutting edge advance and cutting speed effected by relative rotation between said tool and the member to be threaded about the longitudinal axis of the member to be threaded.

2. The thread chaser tool of claim 1, with said point profiles separation also a definitive measurement function of the slope of a tapered thread profile of predetermined taper of tapered threads being formed thereby as further determined by a predetermined linearly varied feed rate imposed thereon.

3. The thread chaser tool of claim 2, with said points being spaced to place the point tip radius of the leading one of said point profiles in line with the flank cut by the trailing one of said point profiles upon engagement of said tool with said member to cut thereon tapered threads having said predetermined taper and said predetermined pitch.

4. The thread chaser tool of claim 3, with said tool cutting edge being shaped to form the thread crest through contiguous straight and tapered thread profiles, thereby providing crest control.

5. The thread chaser tool of claim 1, wherein said small space increment relative to the predetermined normal pitch distance is said pitch distance multiplied by the tangent of the taper angle with the center line of the member to be threaded further multiplied by the tangent of the thread flank angle.

* * * * *